United States Patent [19]

Jackson et al.

[11] Patent Number: 5,605,277

[45] Date of Patent: Feb. 25, 1997

[54] HOT VACUUM DEVICE REMOVAL PROCESS AND APPARATUS

[75] Inventors: Raymond A. Jackson; Kathleen A. Lidestri; William E. Sablinski; David C. Linnell; Raj N. Master, all of Dutchess County, N.Y.

[73] Assignee: International Business Machines Corporation, Armonk, N.Y.

[21] Appl. No.: 360,100

[22] Filed: Dec. 20, 1994

[51] Int. Cl.$^6$ .................................................. B23K 1/018
[52] U.S. Cl. .................. 228/264; 228/9; 228/19
[58] Field of Search ............................... 228/102, 264, 228/19, 9; 29/762

[56] References Cited

U.S. PATENT DOCUMENTS

| | | | |
|---|---|---|---|
| 3,735,911 | 5/1973 | Ward | 228/19 |
| 4,552,300 | 11/1985 | Zovko et al. | 228/264 X |
| 4,586,252 | 5/1986 | Faticanti | 228/56.1 |
| 4,767,047 | 8/1988 | Todd et al. | 228/264 X |
| 4,832,249 | 5/1989 | Ehler | 228/264 X |
| 5,065,933 | 11/1991 | Basavanhally | 228/264 X |

OTHER PUBLICATIONS

Kostenko and O'Rourke, "IR/N$_2$ Heated Isothermal and Movable Light Mass Oven", dtd Dec. 1984, IBM Technical Disclosure Bulletin, V27, N7A, pp. 3970 thru 3972.

*Primary Examiner*—Kenneth J. Ramsey
*Attorney, Agent, or Firm*—Whitham, Curtis, Whitham & McGinn; Susan M. Murray

[57] ABSTRACT

A cost efficient, highly reliable method to remove electronic devices and components from substrates eliminates separate tooling for every substrate and device or component size. The apparatus which implements the method allows for multiple device or component removal simultaneously, or in a single sequential operation, in a nondestructive action in a very low cost environment. A box oven and vacuum system and is used with different device or component and substrate sizes providing a simple, low cost, molten device removal procedure, eliminating the need for thermal monitor build and associated profiling for each product. The apparatus works independently of chip type or size, utilizing universal fixturing, and can be set up to pull multiple devices and/or components in a single run.

12 Claims, 4 Drawing Sheets

HOT VACUUM DEVICE REMOVAL PROCESS AND APPARATUS

BACKGROUND OF THE INVENTION

1. Field of the Invention

The present invention generally relates to electronic module repair and, more particularly, to a method for simultaneously removing a plurality of electronic devices or components (e.g., integrated circuit chips, capacitors, etc.) in a nondestructive process at very low cost.

2. Description of the Prior Art

There exists a need for a low-cost, high reliability process and apparatus for the removal of electronic devices and components from substrates, such as modules and printed circuit boards. The process and apparatus should remove devices and components nondestructively. Currently existing high-end processes which offer the desired reliability are quite costly and have relatively long turn around times. These processes are very limited to chip and substrate size and mass. In fact, removal of large chips planned on low-end modules cannot be performed with this technique. Cold processes utilized on low-end products are more risky to both the device and its carrier, often resulting in damage or destruction to either or both the device and its carrier.

Individual "hot" chip removal on high-end modules is accomplished by focusing an infrared lamp source through an aperture onto the back of the device and pulling a vacuum once the solder is molten. This tool and the process of using it is costly and time consuming but necessary to insure high reliability for high-end modules where both the chip and substrate complexity, as well as process sensitivity, is high. Also, as the silicon size continues to increase, focused localized heating techniques cause an extreme thermal gradient, not only in the x-y direction, but also through the z-axis of the chip where increased I/O result in a constant thermal drain from the device. These gradients are not controllable and can induce some defects, or heal other defects, making diagnostics impossible.

Several "cold" processes exist to remove devices on low-end products that are inherently cheaper; however, they run the risk of damage to both the chip and substrate. They include tensile pull, torque removal, and ultrasonic chip removal.

Previously, many chips have been placed on a single module. In some cases, each chip site can only be reworked four times, while each module can only be reflowed twelve times. Today, there are only about seven chips on a module, because the chips are larger. Reworking and reflowing limitations are not nearly as tough to work. The entire module may be heated.

SUMMARY OF THE INVENTION

It is therefore an object of the present invention to provide a cost efficient, highly reliable method to remove integrated circuit chips and other components from substrates.

It is further an object of the invention to provide a method which eliminates separate tooling for every module or chip size.

It is also an object of the invention to provide a method which allows for multiple device or component removal.

The method according to the invention allows the removal of a plurality of devices and components (e.g., chips, capacitors, etc.) simultaneously, or in a single sequential operation, in a nondestructive action in a very low cost environment. The invention utilizes a box oven and vacuum system and can be used with different chip and substrate sizes.

The invention is a simple, low cost, molten device removal alternative to the current removal processes, utilizing only a box oven and vacuum, and more importantly, eliminating the need for thermal monitor build and associated profiling for each product. It works independently of chip type or size. It also utilizes universal fixturing, and can be set up to pull multiple chips in a single run. The invention eliminates the possibility of defects being induced, or likewise the healing of defects, caused by thermal gradients which occur when using individual backside heating techniques.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
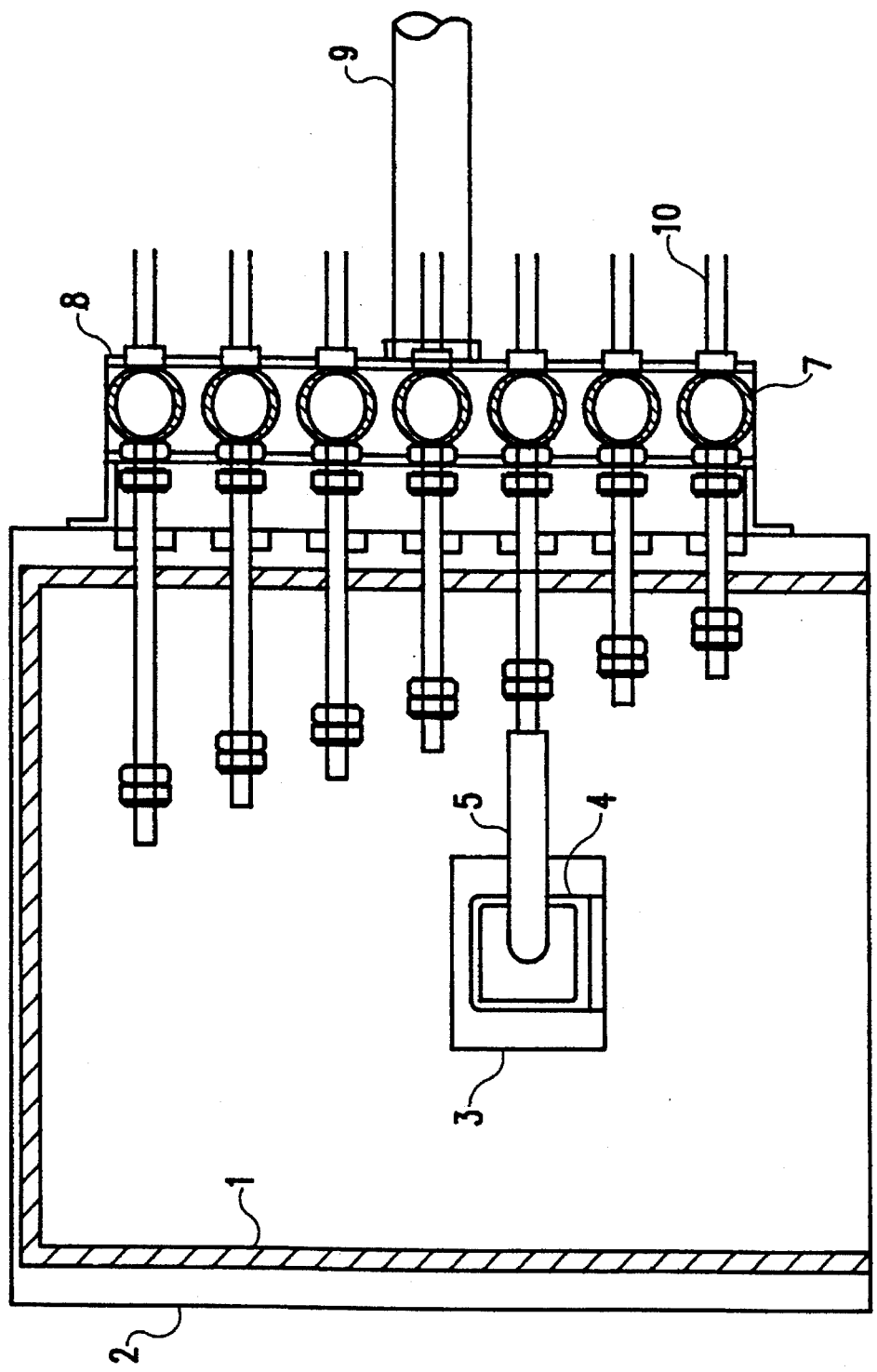
FIG. 1 is a top view, in cross-section, of a box oven used in the practice of a preferred embodiment of the invention.
Figure 2:
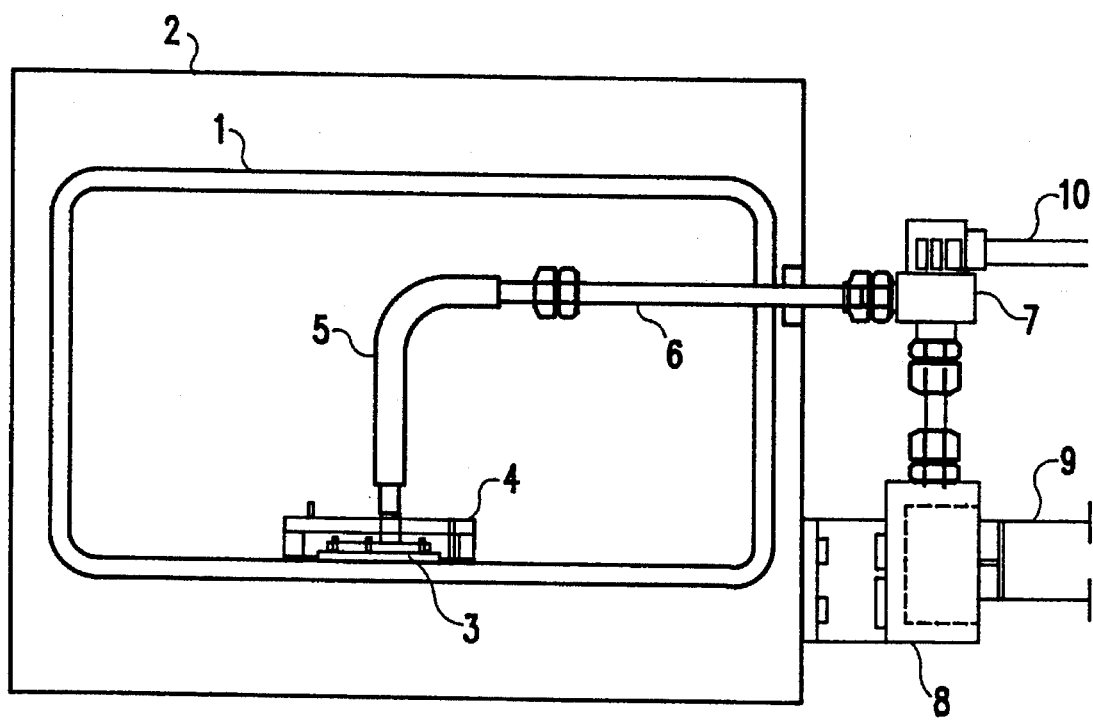
FIG. 2 is a side view, also in cross-section, of the box oven shown in FIG. 1 showing the vacuum manifold.

Referring now to the drawings, and more particularly to FIGS. 1 and 2, there are shown respectively a top view and a side view, both in cross-section, of a typical set up of the apparatus according to the invention for a multiple device or component removal from a plurality of substrates. The apparatus comprises a box oven 1 within a housing or enclosure 2. Within the oven 1 there is a substrate holding fixture 3 and, over that, a probe location fixture 4. Only one substrate holding fixture 3 and probe location fixture 4 are shown for the sake of simplicity, but it will be understood that there are many such fixtures within the oven 1. The substrate holding fixture 3 secures a substrate from which devices or components are to be removed, and the probe location fixture 4 aligns vacuum probes (within the fixture 4 and shown in more detail in FIGS. 3 and 4) above the devices and components to be removed. Flexible stainless steel tubing 5 is connected to each vacuum probe on fixture 4. The flexible stainless steel tubing 5 is in turn connected to rigid stainless steel tubing 6. The flexible stainless steel tubing 5 may be either directly connected to the rigid stainless steel tubing 6 or, in case there are more than one vacuum probe, via a manifold (not shown) to the rigid stainless steel tubing 6. The rigid stainless steel tubing 6 leads out of the oven 1 and housing or enclosure 2 to a corresponding one of a plurality of solenoids 7 connected to a common manifold 8. A hose 9 is connected from the manifold 8 to a vacuum pump (not shown). The solenoids 7 have electrical wires 10 leading to a programmable controller (described in more detail with reference to FIG. 5).

Figure 4:
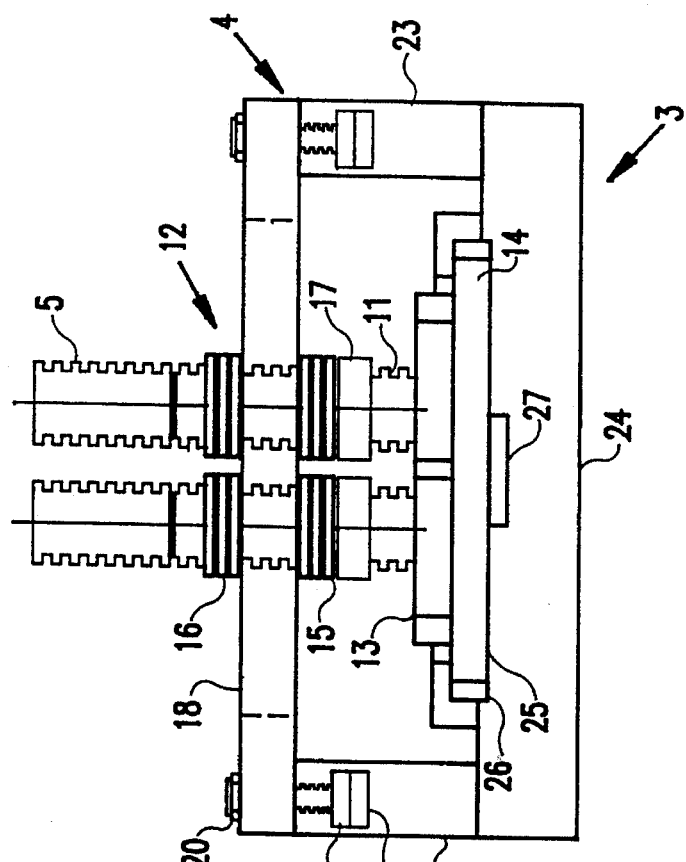
FIG. 4 is a side view of the vacuum removal tool shown in FIG. 3.
Figure 3:
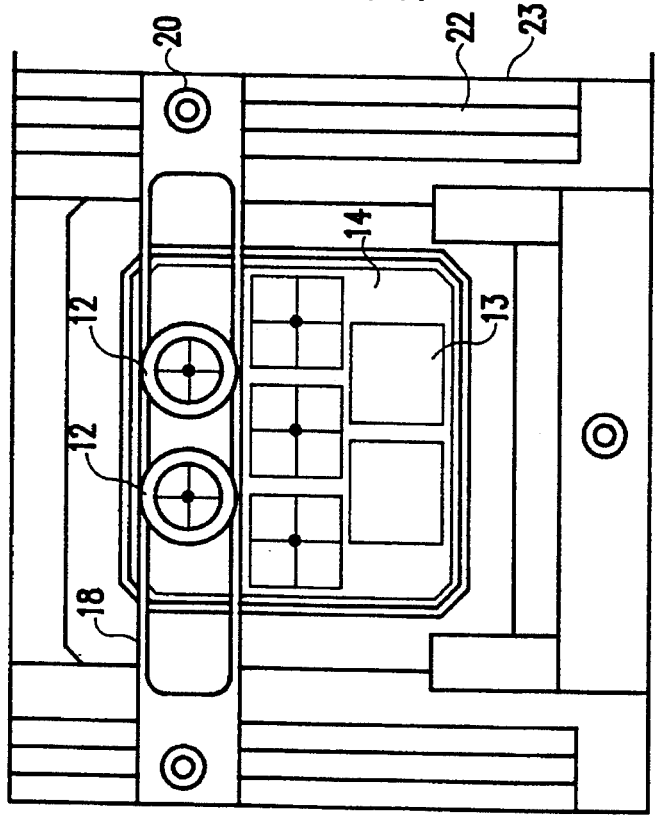
FIG. 3 is a top view of the vacuum removal tool used in the box oven shown in FIGS. 1 and 2.

The substrate holding fixture 3 and the probe location fixture 4 are shown in more detail in FIGS. 3 and 4, to which reference is now made. The tips 11 of probes 12 are placed above a device 13 on a substrate 14. The probes 12 each comprise a pair of knurled nuts 15 and 16 on a threaded ferrule 17 which, at the upper end thereof, receives the flexible stainless steel tubing 5 and, at the other end thereof, forms the tip 11. The nuts 15 and 16 are on either side of a slotted bar 18. As can be seen in FIG. 3, the slot in the bar 18 allows the probes 12 to positioned along the axis of the bar. As best seen in FIG. 4, by adjusting the two nuts 15 and 16, the height of the tip 11 can be precisely adjusted above the device or component 13. Then, by rotating the nuts in opposite directions, the tip can be securely locked in place. The slotted bar 18 is provided at either end thereof with screws 20 and nuts 21. As can be seen in FIG. 4, the heads of the screws 20 ride in T-slots 22 formed in rails 23. The slotted bar 18 can be moved in a horizontal direction as viewed in FIG. 3, and when positioned as desired, the nuts 20 can be tightened to secure the bar 18 in position relative to the rails 23. The rails 23 are attached to the substrate holding fixture 3 and, together with the slotted bar 18, comprise the probe location fixture 4. The substrate holding fixture 3 comprises a base 24 having a recess 25 into which substrates of different sizes may be placed. the substrates are held in place by stainless steel springs 26 within the recess 25. A thermocouple 27 is in thermal contact with the base of substrate 14 and generates a signal proportional to the temperature of the substrate. This signal is used to determine when the solder is in a molten condition, allowing selected ones of the devices or components 13 to be lifted and removed from the substrate 14.

In operation, a vacuum is drawn on the manifold 8. The oven 1 is heated to melt the solder securing the devices or components 13 to the substrates 14. When the solder is molten, the controller energizes the solenoids 7 so that a vacuum is drawn at the tips 11 adjacent those devices or components 13 that are to be removed. Once the solder is molten, the low pressure at the tip 11 proximate the device or component 13 easily lifts and removes the device or component from the substrate 14. If the vacuum pump to which the hose 9 is attached has sufficient capacity, all or a plurality of solenoids 7 can be simultaneously energized. In the preferred implementation of the invention, however, the solenoids 7 are sequentially energized by the controller, lifting and removing each device or component 13 in a programmed order. Once lifted, the device or component 13 blocks the opening in the tip 11 of the probe 12 so that when the solenoid 7 connected to the probe 12 is deactivated, the pressure within the flexible stainless steel tubing 5 remains low, holding the device or component 13 above the substrate 14.

Figure 5:
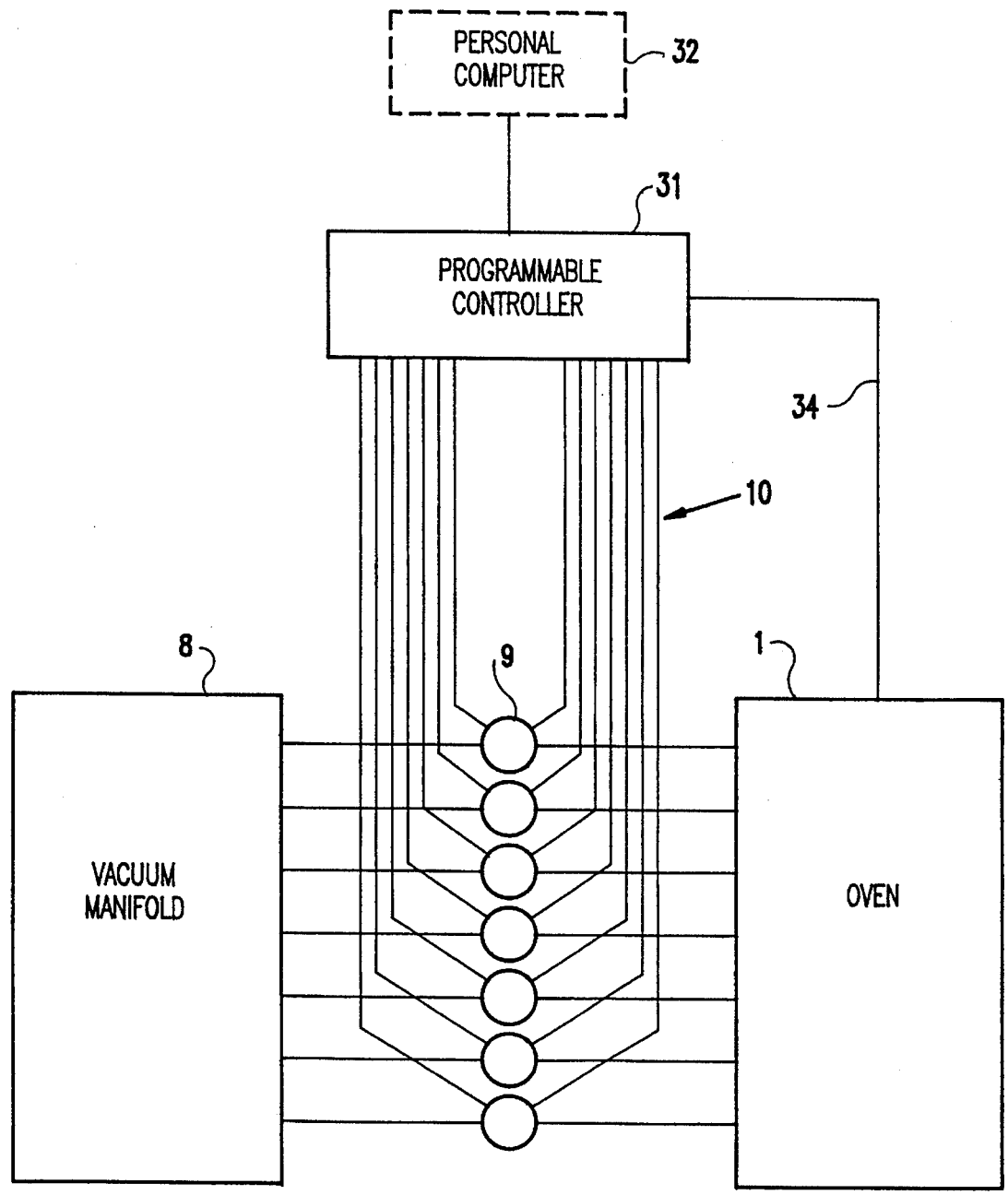
FIG. 5 is a block diagram illustrating the functional components used in the hot vacuum device removal according the invention.

The block diagram in FIG. 5 shows the overall system according to the invention. A programmable controller 31 is connected to a personal computer 32 and receives information from the thermocouple 27 (FIG. 4) which is in contact with the substrate 14 within the oven 1. The thermocouple 27 contacting the substrate generates a signal on line 34 which is indicative of the temperature of the substrate. The controller 31 compares this signal with a predetermined voltage level corresponding to the melting temperature of solder. When the temperature of the substrate reaches the melting temperature of solder, the controller 31 sends an interrupt to the personal computer 32 to initiate the removal process. The personal computer 32 in turn directs the programmable controller 31 to activate solenoids 7 via wires 10 according to a predetermined sequence.

In a specific implementation, a standard box oven, with temperature capability of a 450°–500° C. was used in conjunction with a house vacuum line (or vacuum pump) and desired ambient. Any size or type of module is placed in a universal carrier and a spring loaded thermocouple is contacted to the surface. A stainless steel tip was fitted into the entry vacuum line in the oven and adjusted to be 0.008"–0.010" from the device surface (FIG. 4). The box oven was operated to ramp up the temperature. When the thermocouple touching the module reached its desired set point (e.g., 320° C. for 97Pb/3Sn solder), a signal triggered a solenoid which opened the vacuum line. When the chip detached and contacted the tip, a pressure switch sensed a change in pressure and switched off the heater. If the oven has cooling capability, a cooling cycle may be initiated. Using this technique, a standard box oven is made to replicate the same dwell times as expensive belt furnaces.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An apparatus for non-destructively removing multiple electronic devices and components from a substrate comprising:

an oven;

a substrate fixture for securing a substrate within the oven;

a probe fixture proximate the substrate fixture holding at least one vacuum tip placed proximate a device or component to be removed from the substrate;

a vacuum source connected to said vacuum tip;

a temperature sensing means in thermal contact with the substrate; and a means for activating said vacuum source, responsive to said temperature sensing means whereby, upon the temperature sensing means sensing a predetermined temperature, a signal is sent to the activating means which activates the vacuum source, thereby lifting and removing the device or component from the substrate.

2. The apparatus of claim 1 wherein said probe fixture comprises a plurality of vacuum tips individually positionable proximate respective ones of said devices and components to be removed from said substrate and further comprising a manifold connecting each of said vacuum tips to said vacuum source.

3. The apparatus of claim 2 further comprising a plurality of solenoids attached to said manifold for controlling communication between corresponding vacuum tips and said vacuum source and wherein said means for activating said vacuum source controls said solenoids to open communication between the vacuum tips and said vacuum source.

4. The apparatus of claim 3 wherein said means for activating said vacuum source energizes said solenoids in a predetermined sequence.

5. The apparatus of claim 1 wherein said oven is a temperature controlled oven.

6. The apparatus of claim 5 wherein said temperature sensing means is a thermocouple in thermal contact with said substrate.

7. The apparatus of claim 6 wherein said probe fixture comprises a plurality of vacuum tips individually positionable proximate respective ones of said devices and components to be removed from said substrate and further comprising a manifold connecting each of said vacuum tips to said vacuum source.

8. The apparatus of claim 7 further comprising a plurality of solenoids attached to said manifold for controlling communication between corresponding vacuum tips and said vacuum source and wherein said means for activating said vacuum source controls said solenoids to open communication between the vacuum tips and said vacuum source.

9. The apparatus of claim 8 wherein said means for activating said vacuum source energizes said solenoids in a predetermined sequence.

10. A method for non-destructively removing multiple electronic devices and components from a substrate comprising the steps of:

securing a substrate within an oven;

positioning a probe fixture proximate the substrate fixture and positioning at least one vacuum tip on the probe fixture proximate a device or component to be removed from the substrate;

connecting a vacuum source to said vacuum tip;

sensing a temperature of the substrate; and activating said vacuum source, responsive to a sensed temperature of the substrate reaching a predetermined value, thereby lifting and removing the device or component from the substrate.

11. The method claim 10 further comprising the steps of:

individually positioning a plurality of vacuum tips individually positionable proximate respective ones of said devices and components to be removed from said substrate; and connecting each of said vacuum tips to said vacuum source.

12. The method of claim 11 further comprising the step of connecting said vacuum tips to said vacuum source in a predetermined sequence.

* * * * *